P. S. KOTARSKI.
PUNCTUREPROOF PNEUMATIC TIRE.
APPLICATION FILED DEC. 2, 1921.
1,409,382. Patented Mar. 14, 1922.
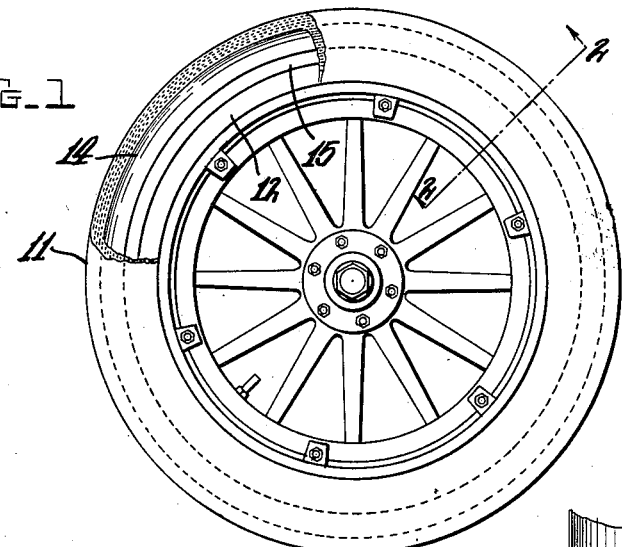
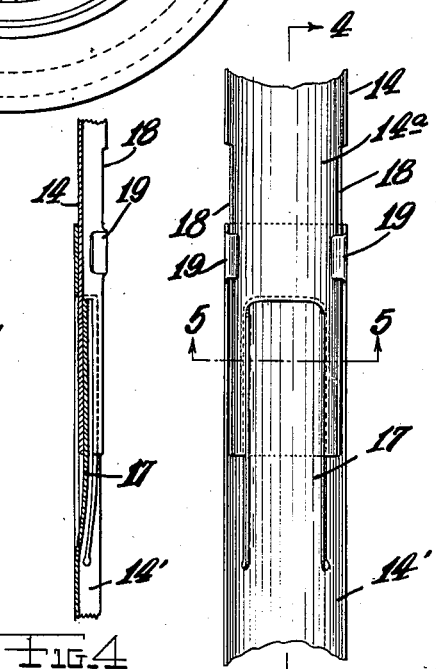
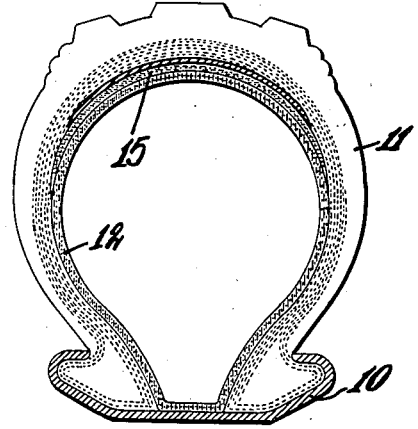
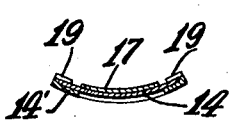
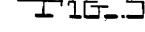
Inventor
Peter S. Kotarski
By
Attorney

UNITED STATES PATENT OFFICE.

PETER S. KOTARSKI, OF EDWARDSVILLE, PENNSYLVANIA.

PUNCTUREPROOF PNEUMATIC TIRE.

1,409,382.   Specification of Letters Patent.   Patented Mar. 14, 1922.

Application filed December 2, 1921. Serial No. 519,319.

*To all whom it may concern:*

Be it known that I, PETER S. KOTARSKI, citizen of the United States, residing at Edwardsville, in the county of Luzerne and State of Pennsylvania, have invented certain new and useful Improvements in Punctureproof Pneumatic Tires, of which the following is a specification.

This invention relates to pneumatic tires for automobiles or other vehicles, having particular reference to the protection of the air tube against puncture.

The invention has for an object to provide a simple and inexpensive means which will adequately protect the air tube from puncture, and which can be readily applied to any ordinary tire.

For further comprehension of the invention, and of the objects and advantages thereof, reference will be had to the following description and accompanying drawings, and to the appended claims in which the various novel features of the invention are more particularly set forth.

Fig. 1 of the drawings is a face view of an automobile wheel the tire whereof has the invention applied thereto, a portion of the outer tube being broken away to show the protecting means for the air tube.

Fig. 2 is an enlarged detail transverse section on the line 2—2 of Fig. 1, the felly of the wheel being omitted.

Fig. 3 is a fragmentary inside view of the protecting, puncture proof device.

Fig. 4 is a longitudinal section on the line 4—4 of Fig. 3.

Fig. 5 is a transverse section on the line 5—5 of Fig. 3.

Referring now to the drawings the reference numeral 10 indicates the usual rim of an automobile wheel, 11 the outer tube of the tire which is engaged by the rim, and 12 the air tube, or inner tube. The inner tube 12 is of usual construction and the outer tube 11 may be built up generally in the usual manner.

My improved protecting device for the inner tube comprises a ring 14 preferably made of sheet steel and carved transversely so as to fit snugly within the outer tube. This ring is fitted into the outer tube as shown and is covered on the inside by a canvas strip 15 which is interposed between the ring and the inner tube 12. The canvas 12 projects at its edges beyond the metal ring and these projecting edge portions may be cemented to the outer tube.

In order to enable the ring 14 to be inserted in the outer tube it is split, the two ends being engaged with one another in the manner shown in Figs. 3 to 5 of the drawings. One of the ends, 14′, has struck inwardly therefrom a longitudinal tongue 17 which is located midway between opposite edges of the ring and has its tip facing toward the extremity and spaced a short distance therefrom. The opposite end portion 14$^a$ overlaps the portion 14′ and fits between the tongue 17 and the main body of said portion. The end 14$^a$ has the sides thereof checked inwardly as at 18, while the end 14′ has a pair of inturned hooked lugs 19 engaging over said sides.

The tongue 17 and side checks 18 are of sufficient length to permit of the ring 14 being contracted sufficiently, after the two ends are engaged as above set forth with one another to enable the ring to be inserted in the outer tube 11, while maintaining engagement of the said parts when the ring expands within the said tube.

As will be apparent, I have provided a simple and inexpensive means for protecting the inner tube against puncture which can be readily applied to any tire and does not need to be built into the tire when the latter is being constructed.

Having thus described my invention what I claim as new and desire to protect by Letters Patent of the United States is as follows:

1. In a pneumatic tire, a transversely split metal protecting ring one of the ends whereof has a metal tongue struck therefrom and extending in parallelism therewith, the other end being adapted to engage over the first end and under said tongue.

2. In a pneumatic tire, a transversely split metal protecting ring one of the ends whereof has a metal tongue struck therefrom and extending in parallelism therewith, the other end being adapted to engage over the first end and under said tongue; said last named end having hooked lugs engaging over the sides of the first end.

In testimony whereof I have affixed my signature.

PETER S. KOTARSKI.